US010053899B2

(12) United States Patent
deNormand et al.

(10) Patent No.: US 10,053,899 B2
(45) Date of Patent: Aug. 21, 2018

(54) SIDE-LOAD, CONSTANT FORCE WINDOW AND WINDOW BALANCE ASSEMBLY

(71) Applicant: Caldwell Manufacturing Company North America, Rochester, NY (US)

(72) Inventors: Richard S. deNormand, Victor, NY (US); Jay Sofianek, Webster, NY (US)

(73) Assignee: Caldwell Manufacturing Company North America, LLC, Rochester, NY (US)

( * ) Notice: Subject to any disclaimer, the term of this patent is extended or adjusted under 35 U.S.C. 154(b) by 93 days.

(21) Appl. No.: 15/257,183

(22) Filed: Sep. 6, 2016

(65) Prior Publication Data

US 2017/0074016 A1    Mar. 16, 2017

Related U.S. Application Data

(60) Provisional application No. 62/218,201, filed on Sep. 14, 2015.

(51) Int. Cl.
*E05F 1/00* (2006.01)
*E05D 13/00* (2006.01)
(Continued)

(52) U.S. Cl.
CPC ............ *E05D 13/1276* (2013.01); *E05C 3/06* (2013.01); *E05D 15/165* (2013.01); *E05D 15/22* (2013.01);
(Continued)

(58) Field of Classification Search
CPC ........ E05D 13/1276; E05D 15/22; F16F 1/10; E06B 3/4415; E05C 3/06
(Continued)

(56) References Cited

U.S. PATENT DOCUMENTS

| 4,961,247 A * | 10/1990 | Leitzel | E05D 13/1276 16/193 |
| 6,393,661 B1 * | 5/2002 | Braid | E05D 13/1276 16/193 |

(Continued)

FOREIGN PATENT DOCUMENTS

| CA | 2820240 A1 * | 1/2014 | ......... E05D 13/1276 |
| CA | 2838530 A1 * | 9/2014 | ......... E05D 13/1276 |

(Continued)

OTHER PUBLICATIONS

"Side Load Constant Force Balance System . . . has a New and improved look!" John Evans' Sons [Advertisement], Feb. 2016, one page.

(Continued)

*Primary Examiner* — Jerry E Redman
(74) *Attorney, Agent, or Firm* — Harness, Dickey & Pierce, P.L.C.

(57) ABSTRACT

A constant force window balance assembly for a side-load, hung window is disclosed. A side rail of a window sash disposed in a jamb channel has a first opening. The balance assembly is installed in the jamb channel and engages the sash at the first opening to support the sash with a counterbalance force. A carrier of the balance assembly includes a body having a sash engaging seat located at an upper end that directly engages the first opening in the side wall of the side rail of the window sash. The carrier can also include a lip located at an inner side of the carrier and extending upwardly from the sash engaging seat. The carrier can also include a projection at an upper end of the body to engage a retaining aperture in an uncurled end portion of a curl spring in a pre-installed configuration of the window balance.

24 Claims, 10 Drawing Sheets

(51) Int. Cl.
*E05C 3/06* (2006.01)
*E05D 15/16* (2006.01)
*E05D 15/22* (2006.01)
*E06B 3/44* (2006.01)
*F16F 1/10* (2006.01)

(52) U.S. Cl.
CPC .............. *E06B 3/4415* (2013.01); *F16F 1/10* (2013.01); *E05Y 2900/148* (2013.01)

(58) Field of Classification Search
USPC .................................................. 49/445, 447
See application file for complete search history.

(56) References Cited

U.S. PATENT DOCUMENTS

| | | | |
|---|---|---|---|
| 6,553,620 B2* | 4/2003 | Guillemet | E05D 13/1276 16/197 |
| 7,980,028 B1 | 7/2011 | Kunz | |
| 8,181,396 B1 | 5/2012 | Kunz | |
| 8,296,903 B1* | 10/2012 | Steen | E05D 13/12 16/197 |
| 8,448,296 B2* | 5/2013 | Kellum, III | E05D 13/1253 16/193 |
| 8,505,242 B1* | 8/2013 | Kunz | E05D 13/1276 16/197 |
| 9,038,315 B2* | 5/2015 | Kellum, III | E05D 13/06 49/116 |
| 9,115,522 B2* | 8/2015 | Sofianek | E05D 13/1276 |
| 9,863,176 B2* | 1/2018 | Kellum, III | E05D 13/14 |
| 2004/0006845 A1* | 1/2004 | Polowinczak | E05D 13/1276 16/197 |
| 2004/0065016 A1* | 4/2004 | Malek | E05D 15/22 49/181 |
| 2005/0160676 A1* | 7/2005 | Pettit | E05D 13/08 49/447 |
| 2005/0166461 A1* | 8/2005 | Lucci | E05D 13/10 49/446 |
| 2006/0096178 A1* | 5/2006 | Braid | E05D 13/1276 49/447 |
| 2008/0034537 A1* | 2/2008 | Tuller | E05D 13/08 16/197 |
| 2009/0223134 A1* | 9/2009 | Lundahl | E05D 13/1276 49/445 |
| 2009/0260295 A1* | 10/2009 | Tuller | E05D 13/08 49/445 |
| 2013/0283699 A1* | 10/2013 | Kellum, III | E05D 13/1276 49/429 |
| 2013/0333293 A1 | 12/2013 | Sofianek et al. | |
| 2014/0000172 A1* | 1/2014 | Sofianek | E05D 13/12 49/430 |
| 2014/0208653 A1* | 7/2014 | Sofianek | E05D 13/1276 49/150 |
| 2017/0101812 A1* | 4/2017 | Baker | E05D 13/1276 |
| 2017/0130498 A1* | 5/2017 | deNormand | E05D 15/165 |

FOREIGN PATENT DOCUMENTS

| | | | | |
|---|---|---|---|---|
| CA | 2846728 A1 * | 9/2014 | ........ | E05D 13/1276 |
| CA | 2941847 A1 * | 3/2017 | ........ | E05D 13/1276 |

OTHER PUBLICATIONS

"Side Load Constant Force Balance System for Wood Windows—Components." John Evans' Sons [Brochure], Mar. 25, 2015, four pages.

* cited by examiner

SIDE-LOAD, CONSTANT FORCE WINDOW AND WINDOW BALANCE ASSEMBLY

CROSS-REFERENCE TO RELATED APPLICATIONS

This application claims the benefit of U.S. Provisional Application No. 62/218,201, filed on Sep. 14, 2015. The entire disclosure(s) of the above application is incorporated herein by reference.

FIELD

The present disclosure relates to window balance assemblies, and more particularly to a constant force, moving coil window balance assembly for hung windows having side-loading window sashes.

BACKGROUND

This section provides background information related to the present disclosure and is not necessarily prior art.

Modern window assemblies in residential, commercial and industrial buildings may include one or more window sashes that are movable within a window jamb. Window sashes that move vertically to open and close often include two or more window balance assemblies. The balance assemblies urge the window sash upward (i.e., toward an open position for a lower sash or toward a closed position for an upper sash) to assist a user in moving the window sash and to retain the window sash at a position selected by the user. A single-hung window features a stationary top sash and a bottom sash that slides vertically up and down. In addition, many single- and double-hung windows allow for the window sashes to be removed from the window frame for easy cleaning. A side-load window sash can be removed vertically from of its associated window balances and be maneuvered horizontally within the jambs of the window frame to enable the window sash to be removed.

SUMMARY

This section provides a general summary of the disclosure, and is not a comprehensive disclosure of its full scope or all of its features.

In one aspect, the present disclosure provides a side-load, hung window assembly. The window assembly includes a window frame including a window jamb defining a jamb channel. A window sash is disposed in the window frame and includes a side rail. The side rail has a side wall having a first opening. A window balance assembly is installed in the jamb channel and engages the window sash to support the window sash with a counterbalance force.

The window balance assembly of the disclosure can include a carrier, a curl spring, and a mounting device. The carrier can include a body having a sash engaging seat located at an upper end that directly engages the first opening in the side wall of the side rail of the window sash. The carrier can also include a lip located at an inner side of the carrier and extending upwardly from the sash engaging seat.

A curled portion of the curl spring is housed in the carrier and an uncurled end portion of the curl spring extends from the carrier on an outer side of the carrier that is opposite to the window sash. The uncurled end portion of the curl spring is secured to the jamb channel by the mounting device.

The side rail of the window sash can further include an inner flange and an outer flange extending outwardly from the window sash toward the jamb channel with the side wall extending between the inner and outer flanges. The carrier can be disposed between the inner and outer flanges. The first opening in the side rail can extend toward a lower end of the side rail and the sash engaging seat can directly engage an upper end of the first opening in the side rail. The sash engaging seat can include a shape that conforms to a shape of the upper end of the first opening in the side rail. In one aspect, the sash engaging seat has an arcuate shape having a first diameter and the upper end of the first opening in the side rail has an arcuate shape having a second diameter, and the first diameter and the second diameter can be substantially the same.

In other aspects of the disclosure, the carrier includes a support that engages the curled portion of the curl spring. The support includes a bearing surface that generally conforms to at least a portion of a shape of the curled portion of the curl spring. The support can include an arcuate-shaped bearing surface that generally conforms to the shape of the curled portion of the curl spring. The support can generally urge the curled portion of the curl spring toward an outer side of the carrier and the wall of the jamb channel.

The carrier can also include a projection at an upper end of the body. The uncurled end portion of the curl spring can include a mounting aperture and a retaining aperture. The projection can engage the retaining aperture causing the curl spring to be biased under tension and retained in the carrier in a pre-installed configuration of the window balance assembly.

In still other aspects of the disclosure, the jamb channel of the side-load, hung window assembly includes a wall having an aperture and the carrier also includes a parking lock located at a lower end of the carrier. The parking lock is operable to engage the aperture in the wall of the jamb channel and fix the carrier relative to the jamb channel to facilitate the side-loading installation and removal of the window sash from the window frame. The parking lock has a hook member attached to the body of the carrier that is rotatable between a stowed position and a deployed position. In the deployed position, the hook member engages the aperture in the wall of the jamb channel. The hook member is retained in the stowed position by a hook release located near the bottom of the body of the carrier. The hook release has an arm and a receiver. The arm includes a cantilevered member that is flexibly attached to the body in a hinge-like manner. The receiver extends from the arm and defines a concave end that engages a curved end portion of the hook member. The receiver can capture the curved end portion of the hook member to retain the hook member in the stowed position. The curved end portion of the hook member can be released from the receiver when the arm is depressed in an upward direction.

In still further aspects of the disclosure, the side-load, hung window assembly can include a sash guide attached to an upper rail of the window sash and extending into a space between the window sash and the jamb channel. The sash guide can include a recess at an outer end to provide clearance for the sash guide to pass over the uncurled end portion of the curl spring and the mounting device. In addition, an aesthetic cover can be disposed over the mounting device. Alternatively or in addition, a spring cover can be disposed over the uncurled end portion of the curl spring and the mounting device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
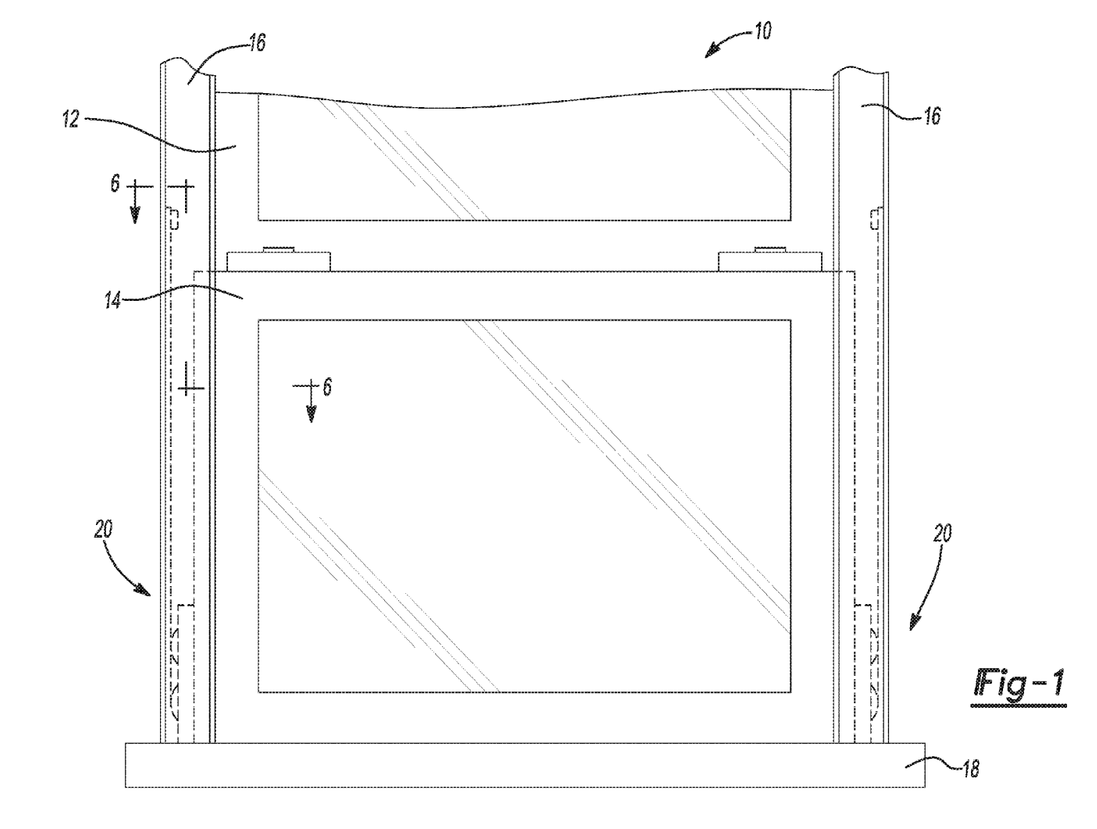
FIG. 1 is a partial front view of a window assembly including window balance assemblies according to the principles of the present disclosure.
Figure 2A:
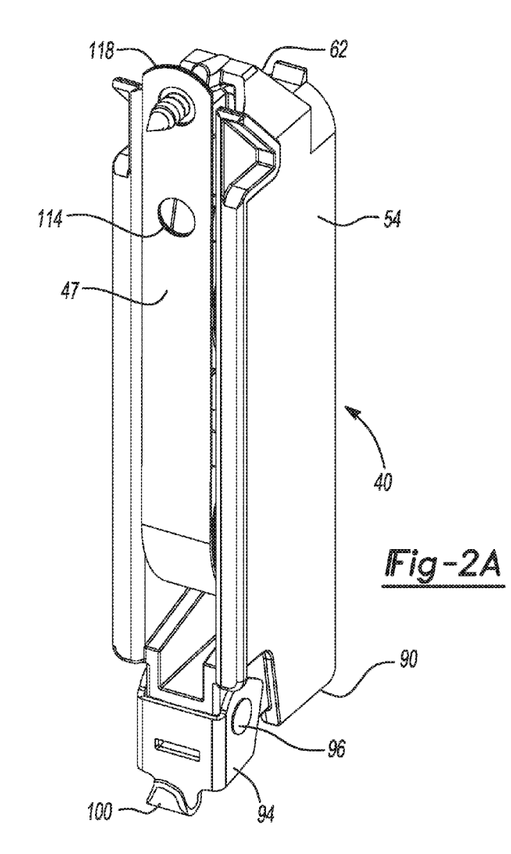
FIG. 2A and FIG. 2B are perspective views of a window balance assembly according to the principles of the present disclosure.
Figure 2B:
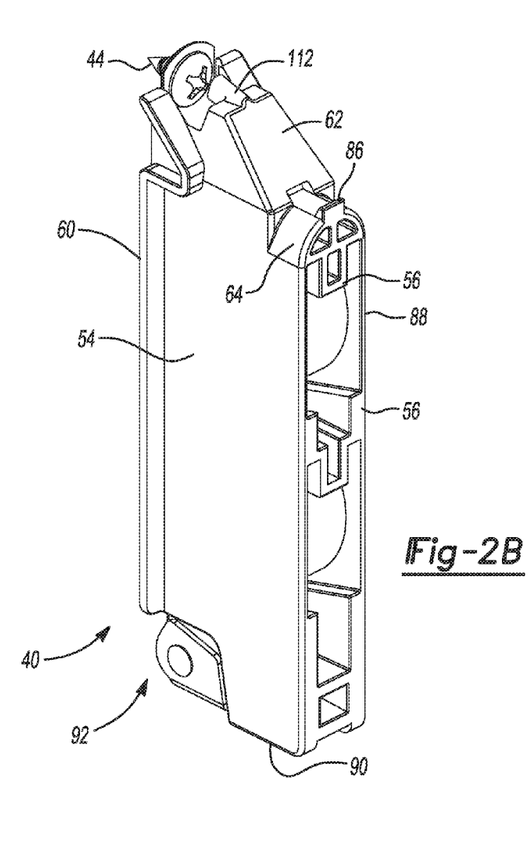

With reference to FIG. 1, a side-load, hung window assembly 10 is shown and can include an upper sash 12, a lower sash 14, a window frame having a pair of vertical window jambs 16, a horizontal window sill 18, and two or more window balance assemblies 20. In the particular embodiment illustrated in FIG. 1, the upper sash 12 is fixed relative to the window sill 18 (i.e., in a single hung window assembly) and the vertically moveable lower sash 14 is a side-load removable sash. However, in some embodiments, the upper sash 12 may also be movable relative to the window sill 18 between a raised or closed position and a lowered or open position (i.e., in a double hung window assembly).

The lower sash 14 may be vertically raised and lowered between open and closed positions and may be connected to the window balance assemblies 20 which assist a user in opening the lower sash 14 and maintain the lower sash 14 in a desired position relative to the window sill 18. It will be appreciated that in a double hung window assembly, the upper sash 12 may also be connected to two or more window balance assemblies to assist the user in opening the upper sash 12 and maintaining the upper sash 12 in a selected position relative to the window sill 18.

Figure 6:
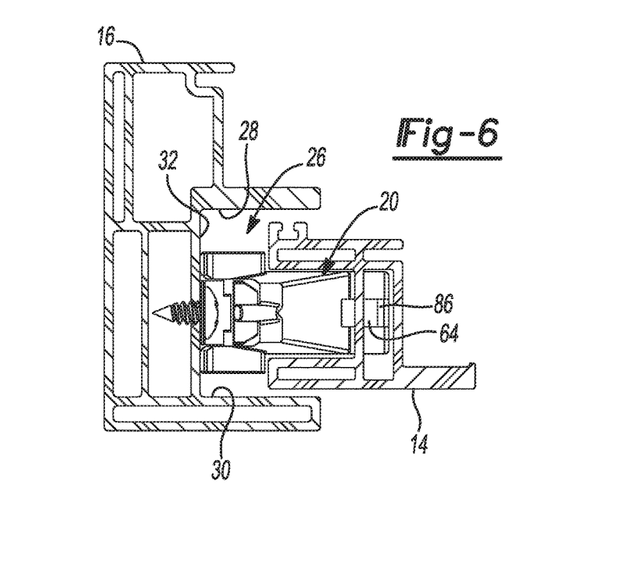
FIG. 6 shows a cross-sectional view along the line 6-6 of FIG. 1.

As best seen in FIG. 6, each window jamb 16 can define a jamb channel 26 including a first wall 28, a second wall 30 opposite the first wall 28, and a third wall 32 disposed perpendicular to the first and second walls 28, 30 (FIGS. 6, 11-14). The window balance assembly 20 may be installed within the jamb channel 26 of the jamb 16.

Each of the window balance assemblies 20 can be described as a side-load, constant force counterbalance and can include a carrier 40, one or more curl springs 42, and a mounting device, such as a threaded fastener or screw 44. The window balance assemblies 20 may be initially assembled and shipped in an uninstalled or shipping configuration (shown in, e.g., in FIG. 10) and may be subsequently installed into the window assembly 10 and placed in an installed configuration (shown in, e.g., FIGS. 1, 6, 12 and 13) by a window manufacturer, a construction or renovation contractor, or a homeowner, for example. The window balance assembly 20 can be non-handed and can be installed in either the right side jamb channel 26 or the left side jamb channel 26 of the window assembly 10.

The carrier 40 can engage the lower sash 14 (see, e.g., FIGS. 8 and 9) near the bottom 50 of the sash 14 to support the sash 14 with a counterbalance force. A curled portion 45 of the curl spring 42 can be housed in the carrier 40 with an uncurled end portion 47 extending from the carrier 40 on an outer side 60 of the carrier 40 that is opposite to the window sash 14. The mounting screw 44 can engage and fix the uncurled end portion 47 of the curl spring 42 to a wall (e.g., third wall 32) of the jamb channel 26, as shown in FIGS. 1, 6, 12 and 16. Thereafter, the carrier 40 can bear the weight of the sash 14, and through the curl spring's 42 resistance to being uncurled, can exert an upward counterbalance force on the carrier 40 and sash 14, thereby biasing the lower sash 14 toward the open position (e.g., against the force of gravity and any frictional forces between the sash and the jamb channel).

The carrier 40 comprises a body 54 that houses the curled portion 45 of the curl spring 42. The body 54 of the carrier 40 can be constructed having a single, unitary case or housing. Alternatively, the body 54 may include a first housing portion and a second housing portion that are joined together in a clamshell-type assembly (not shown). The body 54 can carry and retain the curl spring 42.

As best seen in FIGS. 3, 4, 11 and 13, the interior of the body 54 may include one or more cross members or upper supports 56 positioned above the curled portion 45 of the curl spring 42. The cross members 56 can generally engage and guide the curled portion 45 of the curl spring 42 during operation of the window balance assembly 20. The curled portion 45 of the curl spring 42 can generally nest with the cross members 56. As such, the cross members 56 can have one or more features that generally conform to the curved shape of the curled portion 45 of the curl spring 42, such as one or more contoured or arcuate-shaped bearing surfaces 58, best seen in FIG. 4. The cross members 56 can generally urge the curled portion 45 of the curl spring 42 generally toward an outer side 60 of the carrier 40, away from the window sash 14 and in a direction toward the third wall 32 of the jamb channel 26.

Figure 7:
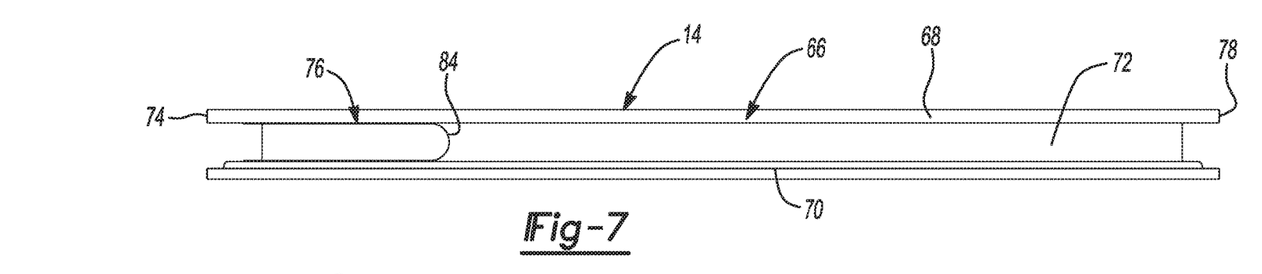
FIG. 7 shows a side view of a window sash for use with a window balance assembly according to the principles of the present disclosure.
Figure 14:
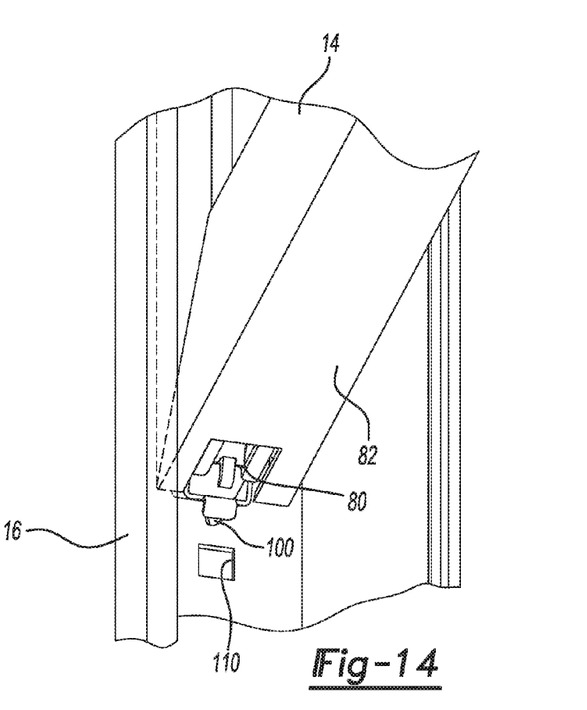
FIG. 14 shows a view of a lower portion of an open window sash and jamb channel in a window assembly including a window balance assembly according to the principles of the present disclosure.

At an upper end 62 of the carrier 40, the body 54 can include a sash engaging seat 64 that can directly engage one or more rails of the window sash 14. The manner in which the carrier 40 can engage the sash 14 is best shown in FIGS. 3 and 7-9. FIG. 7 shows a side view of the window sash 14. As illustrated in FIG. 7, a vertical stile or side rail 66 of the window sash 14 includes inner and outer flanges 68, 70 and a side wall 72 extending between the flanges 68, 70. In the side wall 72 near a lower end 74 of the sash 14, a cut-out or opening 76 can be included. The opening 76 can extend from the lower end 74 of the sash 14 in a direction toward an upper end 78 of the sash 14. Additionally, as shown in FIG. 14, it may be necessary to also provide a cut-out or opening 80 in a bottom wall 82 of the sash 14 to enable the carrier 40 to engage the sash 14, depending on the particular configuration or construction of the sash 14.

Figure 8:
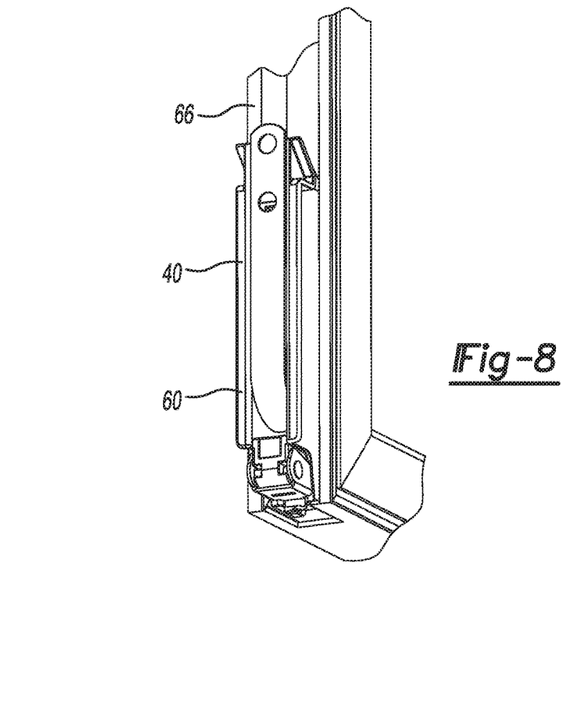
FIGS. 8 and 9 show views of a window sash mounted to a window balance assembly according to the principles of the present disclosure.
Figure 9:
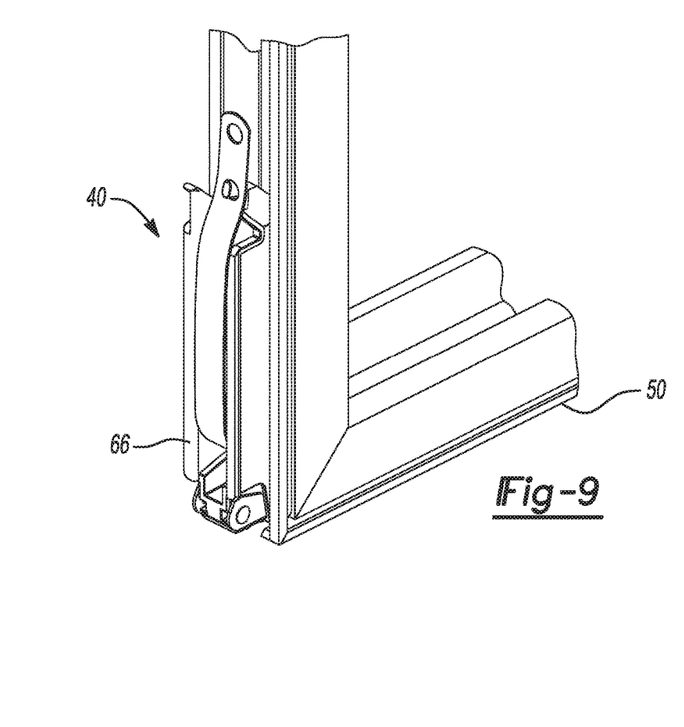

As seen in FIGS. 8 and 9, the opening 76 accommodates the carrier 40 so that the carrier 40 fits closely and/or is disposed between the opposing inner and outer flanges 68, 70 of the sash rail 66. In addition, at an upper end 84 of the opening 76, the opening 76 can be shaped to generally conform to the shape of the sash engaging seat 64 of the carrier 40 body (e.g., the sash engaging seat 64 and the opening 76 can have closely matching diameters). In this manner, the carrier 40 and the sash 14 can fit closely together, evenly distributing the weight of the sash 14 on the carrier 40. As further shown in FIG. 3, a protrusion or lip 86 can be included at an inner side 88 of the carrier 40 and extend upwardly from the sash engaging seat 64. The lip 86 can assist the carrier 40 in capturing the wall 72 of the sash rail 66 at the opening 76 and maintaining close engagement between the carrier 40 and the sash 14.

Referring now to FIGS. 2A, 2B, 4, 4A, 5A, 5C, 12, 13 and 14, the carrier 40 can also include, at a lower end 90, a parking lock feature 92. The parking lock feature 92 can be operable to "park" or fix the carrier 40 of the installed window balance assembly 20 in the jamb 16. In this regard, the carrier 40 is fixed relative to the jamb channel 26 to facilitate the side-loading installation and removal of the window sash 14 from the jamb 16.

With particular reference to FIGS. 2A, 4A, 5A and 5C, the parking lock feature 92 can take the form of a hook member 94 that can be attached to the body 54 of the carrier 40, such as by a pin 96. The hook member 94 can be rotatable between a stowed position and a deployed or use position about the pin 96. In the stowed position (see, e.g., FIG. 5C and FIG. 9) the hook member 94 can be rotated upward and under or into the body 54 of the carrier 40 and can be received in an opening 98 at the bottom of the body 54. In the deployed or use position (e.g., FIGS. 2A, 4A, 5A, 13 and 14), the hook member 94 can be rotated downward so as to extend from the bottom of the body 54 and such that a curved end portion 100 of the hook member 94 protrudes outwardly from the outer side 60 of the carrier 40 toward the third wall 32 of the jamb channel 26.

The hook member 94 can be retained in the stowed position by a hook release 102 that can be included or integrated at the bottom of the body 54. The hook release 102 can include an arm portion 104 and a receiver portion 106. The arm portion 104 of the hook release 102 can define a cantilevered member that can be flexibly attached to the body 54 in a hinge-like manner. The receiver portion 106 can extend from the arm portion 104 and can define a concave end 108 that corresponds with the curved end portion 100 of the hook member 94. The receiver portion 106 can enable the curved end portion 100 of the hook member 94 to be captured and/or nest within the concave end 108 of the hook release 102 by way of a friction fit, a snap fit, or the like. The hook member 94 can be manually moved to the stowed position.

The hook member 94 can be released from the stowed position and deployed to the use position by operation of the hook release 102. In this regard, the arm portion 104 of the hook release 102 can be flexed, such as by depressing the arm portion 104 in an upward direction. As such, the receiver portion 106 of the hook release 102 can rotate slightly and move away from engagement with the curved end portion 100 of the hook member 94. Thereafter, the hook member 94 can be free to rotate downwardly to its deployed position under the force of gravity.

The parking lock feature 92 of the carrier 40 is operable to engage an aperture 110, such as a slot or similar opening, which can be formed in the third wall 32 of the jamb channel 26, as best seen in FIG. 14. With the hook member 94 in the deployed position, the curved end portion 100 can engage the aperture 110 in the jamb channel 26. Once engaged, as shown in FIG. 13, the hook member 94 can resist the counterbalance force of the curl spring 42 and prevent the upward movement of the carrier 40 in the jamb channel 26.

Figure 3:
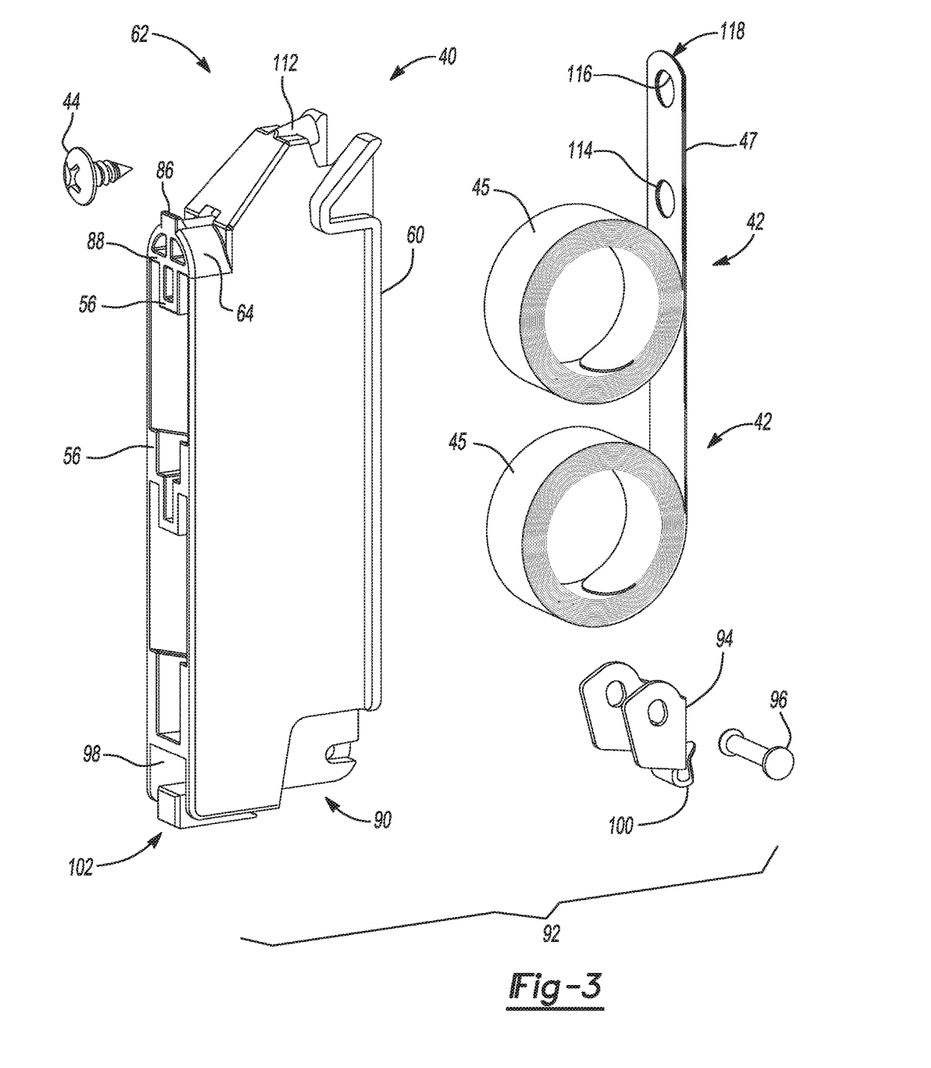
FIG. 3 is an exploded perspective view of the window balance assembly of FIG. 2A.
Figures 4, 4A:
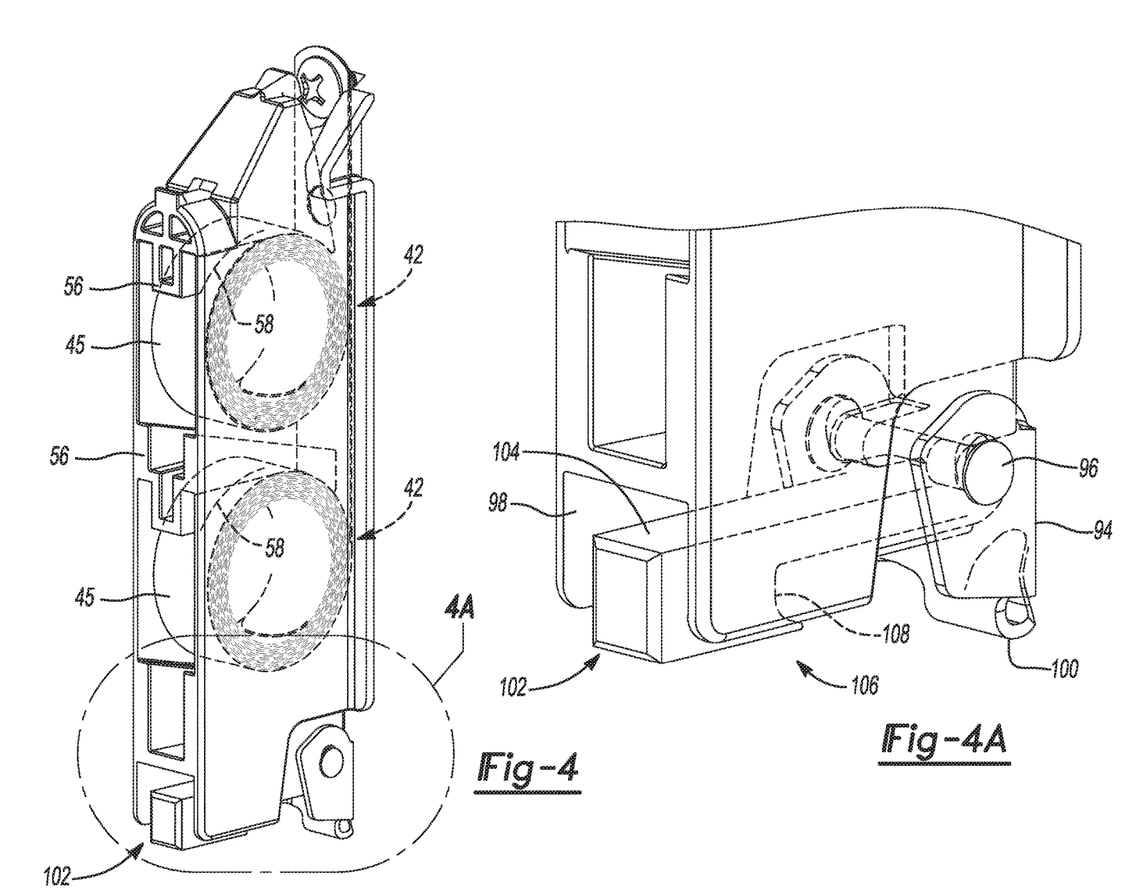
FIG. 4 is a perspective view of the window balance assembly of FIG. 2A with its housing being partially transparent to reveal internal components of the window balance assembly.
FIG. 4A is an enlarged detail portion of FIG. 4.
Figure 5A:
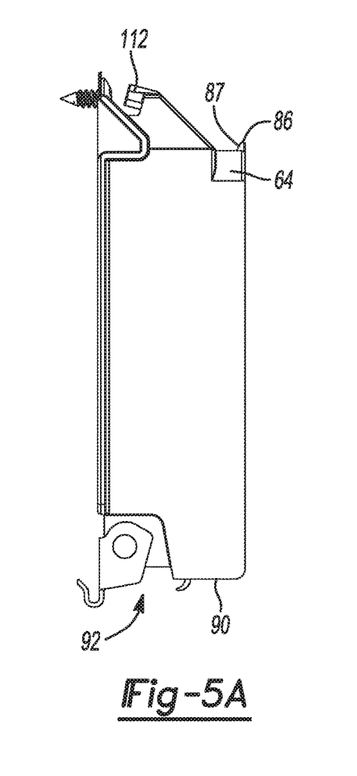
FIGS. 5A-5D show orthogonal views of a window balance assembly according to the principles of the present disclosure.
Figures 5B, 5C:
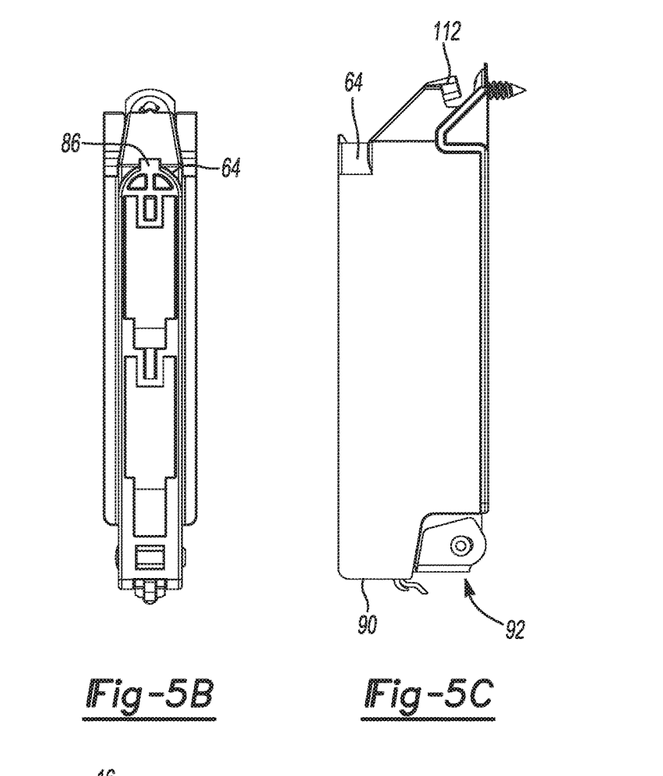
Figure 5D:
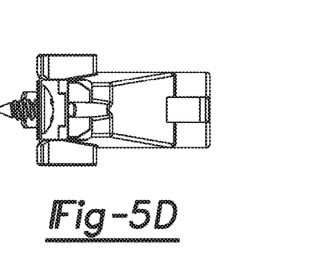
Figure 10:
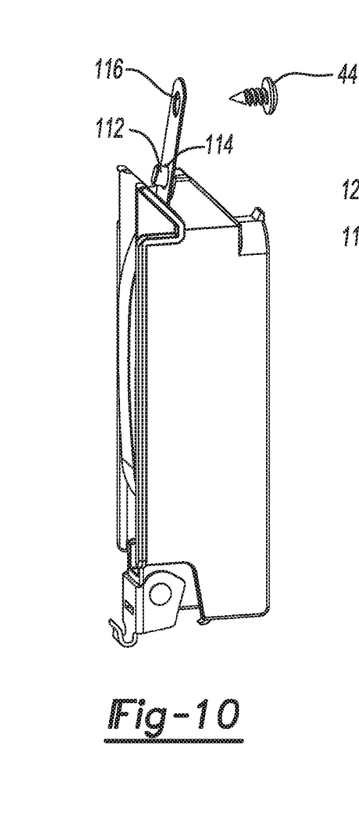
FIG. 10 shows a front view of a window balance assembly according to the principles of the present disclosure in an uninstalled or shipping configuration.

Referring to FIGS. 3 and 10, the pre-installation configuration of the window balance assembly 20 can be understood. As clearly shown in FIGS. 3, 5A and 5C, the carrier 40 can include a projection portion or spring retainer 112 at the upper end 62 of the body. Correspondingly, the uncurled end portion 47 of the curl spring 42 can include a retaining aperture 114, as best seen in FIG. 3. As shown in FIG. 10, the spring retainer 112 can engage the retaining aperture 114. When engaged as shown in FIG. 10, the uncurled end portion 47 of the curl spring 42 can be extended and the curled portion 45 can engage the cross member 56 of the body 54. In this manner, the curl spring 42 can be biased under tension so as to retain the carrier 40 and curl spring 42 in the pre-installed or shipping configuration.

Figure 11:
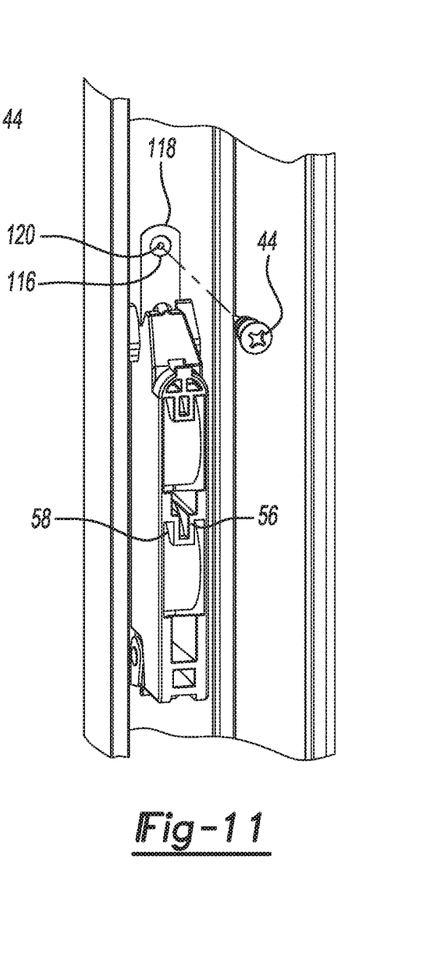
FIG. 11 shows the window balance assembly of FIG. 10 in preparation for installation in a window jamb.
Figure 12:
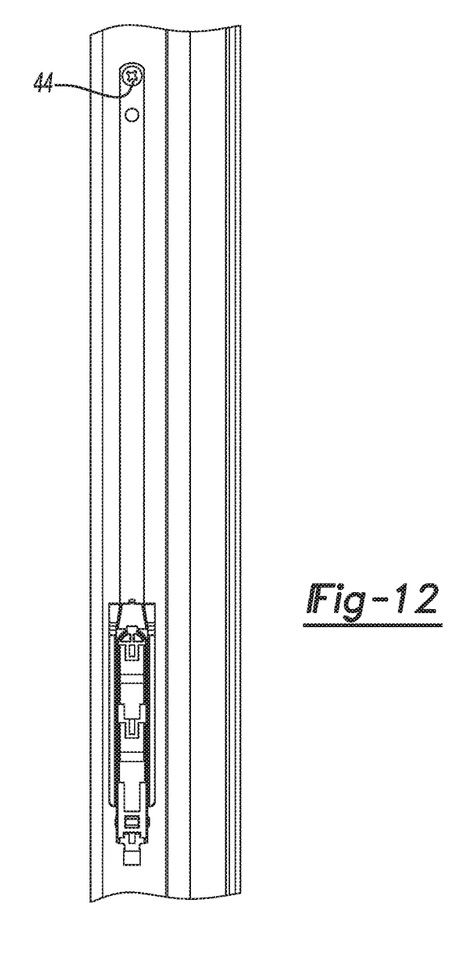
FIG. 12 shows a window balance assembly according to the principles of the present disclosure secured or "parked" in a window jamb and ready for installation of a window sash.
Figure 13:
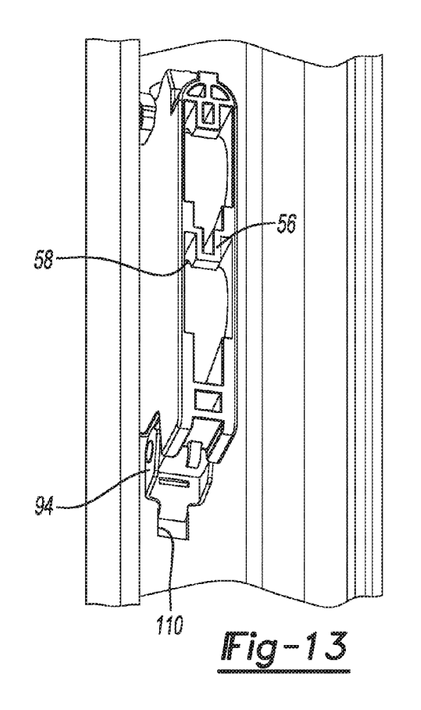
FIG. 13 shows a view of a lower portion of the window balance assembly of FIG. 12.

With reference now to FIGS. 11, 12 and 13, installation of the window balance assembly 20 can be described. With the carrier 40 and curl spring 42 in the pre-installed configuration, a mounting aperture 116 that can be included near the end 118 of the uncurled end portion 47 of the curl spring 42, is easily accessible. The uncurled end portion 47 of the curl spring 42 can thereafter be attached to the third wall 32 of the jamb channel 26 at a location vertically above an upper end of the sash 14 when in the closed position, as also seen in FIG. 1, by way of the mounting screw 44. The mounting screw 44 can be self-drilling or can be received in a pre-defined mounting hole 120 that can be included in the third wall 32 of the jamb channel 26. Thereafter, as shown in FIGS. 12 and 13, the carrier 40 can be moved downwardly in the jamb channel 26 and then fixed or parked in the jamb channel 26 by means of the parking lock feature 92, as seen in FIG. 13. In this configuration, the curl spring 42 can be further uncurled and further biased under tension. Of course, a corresponding window balance assembly 20 is also installed in the opposite jamb channel in a similar manner. Once installed, the window balance assemblies 20 can receive a window sash 14 that can be installed in the window frame in a side-loading manner well-known in the art.

Figure 15:
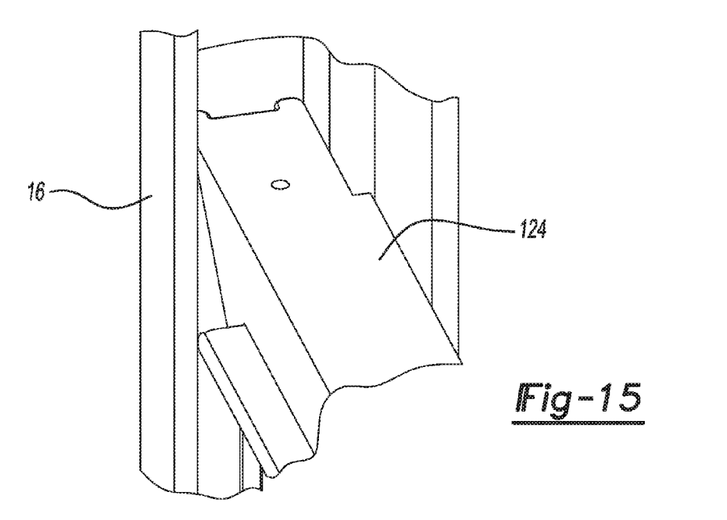
FIG. 15 shows a view of an upper portion of an open window sash with a sash guide removed and jamb channel in a window assembly including a window balance assembly according to the principles of the present disclosure.
Figure 16:
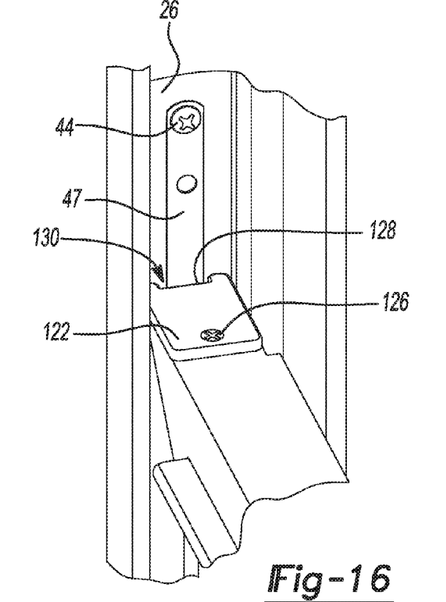
FIG. 16 shows a view of an upper portion of a closed window sash with a sash guide and jamb channel in a window assembly including a window balance assembly according to the principles of the present disclosure.

Referring to FIGS. 15 and 16, the upper portion of a window sash 14 after installation in the window assembly 10 is depicted. As shown in FIG. 16, a sash guide 122 can be included on an upper sash rail 124 of the window sash 14. The sash guide 122 can help align the sash 14 within the jamb channel 26 during the vertical movement of the sash 14. The sash guide 122 can be mounted to the upper rail 124 of the window sash 14 by a threaded faster or screw 126. An opening or recess 128 at the outer end 130 of the sash guide 122 can enable the sash guide 122 to clear the uncurled end portion 47 of the curl spring 42 and allow the sash guide 122 to pass over the mounting screw 44. The sash guide 122 can also serve as a trim piece to improve the finished appearance of the window assembly 10.

Figure 17A:
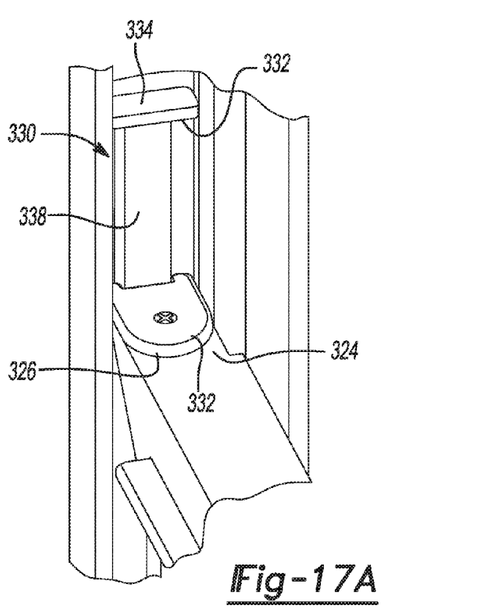
FIGS. 17A-17F show various alternative sash guides for use in a window assembly including a window balance assembly according to the principles of the present disclosure.
Figure 17B:
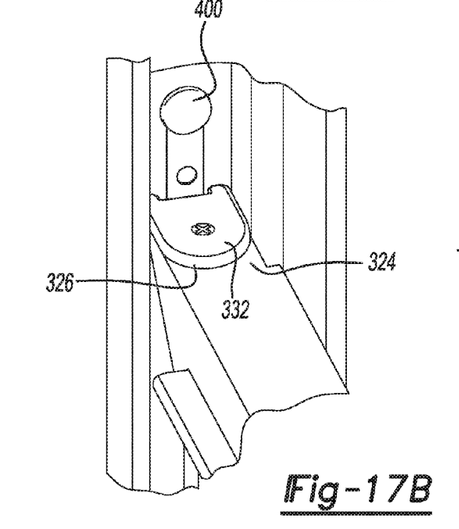

FIGS. 17A and 17B show an alternate configuration of a sash guide 322 for the window assembly 10. The sash guide 322 has an arcuate inner end 324 and includes a bevel 326 that further enhances the finished appearance of the window assembly 10. FIG. 17B shows the sash guide in combination with a button-like cover 400 placed over the mounting screw 44. The cover 400 can, for example, be snap-fit over a head of the mounting screw in a well-known manner. The cover 400 further improves the aesthetic and finished appearance of the installed window balance assembly 20.

Figure 17C:
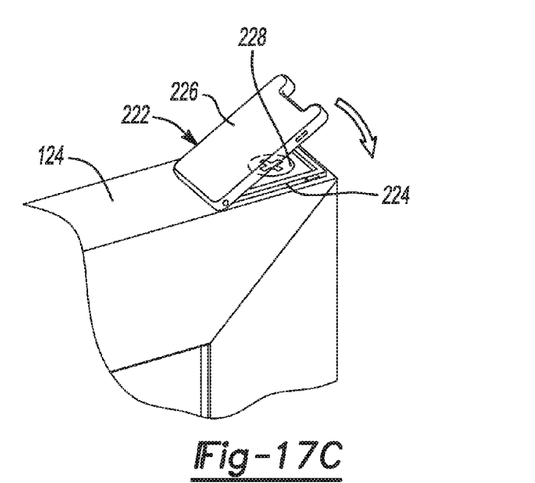
Figures 17D, 17E, 17F:
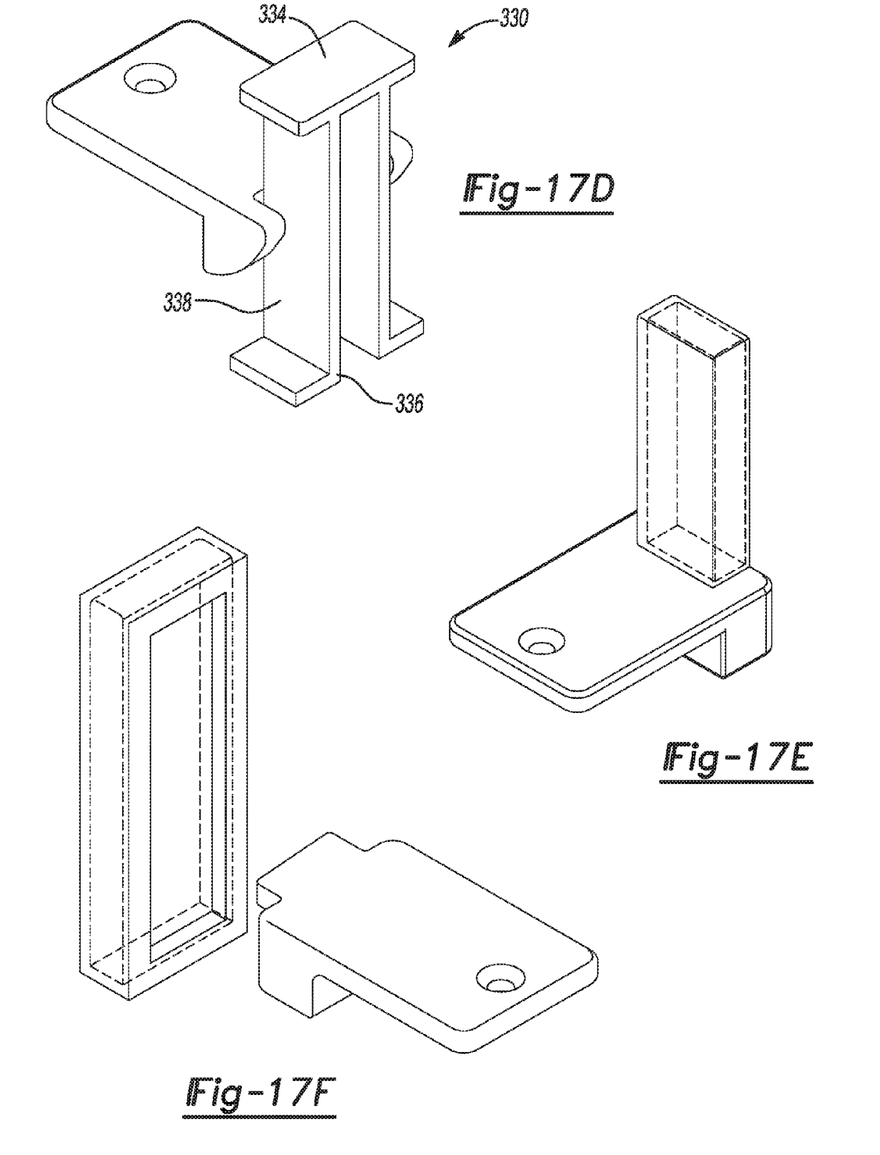

Also shown in FIGS. 17A and 17D is an aesthetic spring cover 330. The spring cover 330 can have a hollow, box-like configuration and can cover the uncurled end portion 47 of the curl spring 42 and the mounting screw 44. The spring cover 330 can be moveable within the jamb channel 26 as the window sash 14 moves up and down. When the sash 14 is raised, the sash guide 322 can engage a lipped edge 332 on a top 334 of the spring cover 330 so as to carry the spring cover 330 vertically upwardly with the sash 14. An open end 336 at the bottom of the spring cover (see, e.g., FIG. 17D) enables the spring cover 330 to move freely over the mounting screw 44. When the sash 14 is lowered, the spring cover 330 moves vertically downwardly by gravity. As shown in FIG. 17A, as the upper rail of the sash 14 passes by the mounting screw 44 the top 334 of the spring cover 330 engages the mounting screw 44 and causes the spring cover 330 to stop moving vertically downwardly. The sash 14, however, continues its downward travel to the closed position and thereby exposes a vertically extending body portion 338 of the spring cover 330. FIG. 17C shows another alternate embodiment of a sash guide. The sash guide 222 can include a base portion 224 and a hinged cover 226. The base portion 224 can be secured to the upper rail 124 of the window sash 14, such as by a threaded fastener 228. The cover 226 can then be closed over and secured to the base portion 224 (e.g., snap fit), thereby covering or hiding the threaded fastener 228.

FIGS. 17D, 17E and 17F show additional alternative sash guide and spring cover configurations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A side-load, hung window assembly comprising:
   a window frame comprising a window jamb defining a jamb channel comprising a wall having an aperture;
   a window sash disposed in the window frame and comprising a side rail, the side rail comprising a side wall having a first opening;
   a window balance assembly installed in the jamb channel, the window balance assembly engaging the window sash to support the window sash with a counterbalance force, the window balance assembly comprising a carrier, a curl spring, and a mounting device;
   wherein the carrier comprises a body having a sash engaging seat located at an upper end that directly engages the first opening in the side wall of the side rail of the window sash;
   wherein a curled portion of the curl spring is housed in the carrier and an uncurled end portion of the curl spring extends from the carrier on an outer side of the carrier that is opposite to the window sash, the uncurled end portion of the curl spring being secured to the jamb channel by the mounting device;
   wherein the carrier comprises a support that engages the curled portion of the curl spring, the support comprising bearing surface that generally conforms to at least a portion of a shape of the curled portion of the curl spring;
   wherein the carrier comprises a parking lock operable to engage the aperture in the wall of the jamb channel and fix the carrier relative to the jamb channel to facilitate the side-loading installation and removal of the window sash from the window frame;
   wherein the parking lock comprises a hook member rotatable between a stowed position and a deployed position wherein the hook member engages the aperture in the wall of the jamb channel.

2. The side-load, hung window assembly of claim 1, wherein the hook member is retained in the stowed position by a hook release comprising an arm and a receiver;
   wherein the arm comprises a cantilevered member that is flexibly attached to the body;
   wherein the receiver extends from the arm and defines a concave end that engages a curved end portion of the hook member;
   wherein the receiver is operable to capture the curved end portion of the hook member to retain the hook member in the stowed position; and
   wherein the receiver is operable to release the curved end portion of the hook member when the arm is depressed in an upward direction.

3. The side-load, hung window assembly of claim 1, wherein the carrier further comprises a lip located at an inner side of the carrier and extending upwardly from the sash engaging seat.

4. The side-load, hung window assembly of claim 1, wherein the side rail of the window sash further comprises an inner flange and an outer flange, the inner and outer flanges extending outwardly from the window sash toward the jamb channel, the side wall extending between the inner and outer flanges;
   wherein the carrier is disposed between the inner and outer flanges of the side rail;
   wherein the first opening in the side rail extends toward a lower end of the side rail; and
   wherein the sash engaging seat directly engages an upper end of the first opening in the side rail.

5. The side-load, hung window assembly of claim 4, wherein the sash engaging seat has a shape that conforms to a shape of the upper end of the first opening in the side rail.

6. The side-load, hung window assembly of claim 5, wherein the sash engaging seat has an arcuate shape having a first diameter and the upper end of the first opening in the side rail has an arcuate shape having a second diameter.

7. The side-load, hung window assembly of claim 6, wherein the first diameter and the second diameter are substantially the same.

8. The side-load, hung window assembly of claim 7, wherein the carrier further comprises a lip located at an inner side of the carrier and extending upwardly from the sash engaging seat.

9. The side-load, hung window assembly of claim 1, wherein the support comprises an arcuate-shaped bearing surface that generally conforms to the shape of the curled portion of the curl spring; and
   wherein the support generally urges the curled portion of the curl spring toward an outer side of the carrier and the wall of the jamb channel.

10. The side-load, hung window assembly of claim 9, wherein the side rail of the sash further comprises an inner flange and an outer flange, the side wall extending between the inner and outer flanges;
    wherein the carrier fits closely between the inner and outer flanges of the side rail;
    wherein the first opening in the side rail extends to a lower end of the side rail;
    wherein the sash engaging seat directly engages an upper end of the first opening in the side rail;
    wherein the sash engaging seat has an arcuate shape having a first diameter and the upper end of the first opening in the side rail has an arcuate shape having a second diameter; and
    wherein the first diameter and the second diameter are substantially the same.

11. The side-load, hung window assembly of claim 10, wherein the carrier further comprises a lip at an inner side of the carrier extending upwardly from the sash engaging seat.

12. The side-load, hung window assembly of claim 1, wherein the window sash further comprises a bottom wall comprising a second opening;
    wherein the side rail of the sash further comprises an inner flange and an outer flange, the a side wall extending between the inner and outer flanges;
    wherein the first opening in the side rail extends to a lower end of the side rail;
    wherein the carrier fits closely between the inner and outer flanges of the side rail and in the second opening of the bottom wall of the sash;
    wherein the sash engaging seat engages an upper end of the first opening in the side rail;
    wherein the sash engaging seat has an arcuate shape having a first diameter and the upper end of the first opening in the side rail has an arcuate shape having a second diameter; and
    wherein the first diameter and the second diameter are substantially the same.

13. The side-load, hung window assembly of claim 1 further comprising a sash guide attached to an upper rail of the window sash and extending into a space between the window sash and the jamb channel;
    wherein the sash guide comprises a recess at an outer end to provide clearance for the sash guide to pass over the uncurled end portion of the curl spring and the mounting device.

14. The side-load, hung window assembly of claim 13 further comprising an aesthetic cover disposed over the mounting device.

15. The side-load, hung window assembly of claim 13 further comprising a spring cover disposed over the uncurled end portion of the curl spring and the mounting device.

16. A window balance assembly comprising:
    a carrier;
    a curl spring comprising a curled portion and an uncurled end portion, the curled portion being housed in the carrier and the uncurled end portion extending from an outer side of the carrier; and
    the carrier comprising:
    a body;
    a sash engaging seat; and
    a lip located at an inner side of the body and extending upwardly from the sash engaging seat;
    a support positioned above the curled portion of the curl spring, the support comprising a lower side that engages the curled portion of the curl spring and urges the curled portion of the curl spring toward the outer side of the carrier;
    wherein the carrier further comprises a projection at the upper end of the body;
    wherein the uncurled end portion of the curl spring comprises a mounting aperture and a retaining aperture; and
    wherein the projection engages the retaining aperture causing the curl spring to be biased under tension and retained in the carrier in a pre-installed configuration of the window balance assembly;
    wherein the carrier further comprises a parking lock located at a lower end of the carrier, the parking lock comprising a hook member pivotably attached to the body of the carrier and rotatable between a stowed position and a deployed position;
    wherein the hook member is retained in the stowed position by a hook release located near the bottom of the body of the carrier, the hook release comprising an arm and a receiver;
    wherein the arm comprises a cantilevered member that is flexibly attached to the body;
    wherein the receiver extends from the arm and defines a concave end that engages a curved end portion of the hook member;
    wherein the receiver is operable to capture the curved end portion of the hook member to retain the hook member in the stowed position; and
    wherein the receiver is operable to disengage from the curved end portion of the hook member when the arm is depressed in an upward direction.

17. The window balance assembly of claim 16, wherein the sash engaging seat has an arcuate shape having a first diameter.

18. The side-load, hung window assembly of claim 16, wherein the lower side of the support comprises at least one bearing surface that generally conforms to at least a portion of a shape of the curled portion of the curl spring.

19. The side-load, hung window assembly of claim 18, wherein the lower side of the support comprises a plurality of arcuate-shaped bearing surfaces that together combine to generally conform to at least a portion of the shape of the curled portion of the curl spring.

20. A window balance assembly comprising:
   a carrier;
   a curl spring comprising a curled portion and an uncurled end portion, the curled portion being housed in the carrier and the uncurled end portion extending from an outer side of the carrier; and
   the carrier comprising:
   a body;
   a sash engaging seat located at an upper end of the body; and
   a parking lock located at a lower end of the carrier, the parking lock comprising a hook member pivotably attached to the body of the carrier and rotatable between a stowed position and a deployed position;
   wherein the hook member is retained in the stowed position by a hook release located near the bottom of the body of the carrier, the hook release comprising an arm and a receiver;
   wherein the arm comprises a cantilevered member that is flexibly attached to the body;
   wherein the receiver extends from the arm and defines a concave end that engages a curved end portion of the hook member;
   wherein the receiver is operable to capture the curved end portion of the hook member to retain the hook member in the stowed position; and
   wherein the receiver is operable to disengage from the curved end portion of the hook member when the arm is depressed in an upward direction.

21. The window balance assembly of claim 20, wherein the carrier further comprises:
   a lip located at an inner side of the body and extending upwardly from the sash engaging seat; and
   a support positioned above the curled portion of the curl spring, the support comprising a lower side that engages the curled portion of the curl spring and urges the curled portion of the curl spring toward the outer side of the carrier.

22. The side-load, hung window assembly of claim 21, wherein the lower side of the support comprises at least one bearing surface that generally conforms to at least a portion of a shape of the curled portion of the curl spring.

23. The window balance assembly of claim 20, wherein the sash engaging seat has an arcuate shape having a first diameter.

24. The window balance assembly of claim 23, wherein the carrier further comprises:
   a projection at the upper end of the body;
   wherein the uncurled end portion of the curl spring comprises a mounting aperture and a retaining aperture; and
   wherein the projection engages the retaining aperture causing the curl spring to be biased under tension and retained in the carrier in a pre-installed configuration of the window balance assembly.

* * * * *

UNITED STATES PATENT AND TRADEMARK OFFICE
CERTIFICATE OF CORRECTION

PATENT NO. : 10,053,899 B2  
APPLICATION NO. : 15/257183  
DATED : August 21, 2018  
INVENTOR(S) : Richard deNormand and Jay Sofianek Page 1 of 1

It is certified that error appears in the above-identified patent and that said Letters Patent is hereby corrected as shown below:

On the Title Page

In Column 1, (71) Applicant, after "America," insert --LLC,--.

In the Claims

In Claim 12, Column 9, Line 61, after "the" delete "a".

In Claim 18, Column 11, Line 4, delete "side-load, hung window" and insert --window balance--.

In Claim 19, Column 11, Line 8, delete "side-load, hung window" and insert --window balance--.

In Claim 22, Column 12, Line 17, delete "side-load, hung window" and insert --window balance--.

Signed and Sealed this  
Twenty-third Day of October, 2018

Andrei Iancu  
*Director of the United States Patent and Trademark Office*